United States Patent [19]

Parkhideh

[11] Patent Number: 5,287,356
[45] Date of Patent: Feb. 15, 1994

[54] AUTOMATIC TERMINATION OF LOOP CIRCULATING MESSAGES

[75] Inventor: Mehr A. Parkhideh, Half Moon Bay, Calif.

[73] Assignee: Harris Corporation, Melbourne, Fla.

[21] Appl. No.: 833,233

[22] Filed: Feb. 10, 1992

[51] Int. Cl.⁵ .......................... H04L 12/42; H04J 3/24
[52] U.S. Cl. .............................. 370/85.12; 370/85.15; 370/94.1; 340/825.05
[58] Field of Search ....................... 370/13, 14, 15, 16, 370/16.1, 54, 60, 85.4, 85.5, 85.13, 85.14, 85.15, 94.1, 85.12; 340/826, 827, 825.05, 825.06; 379/271, 272, 273, 275, 279; 371/10.4, 10.5, 10.6

[56] References Cited

U.S. PATENT DOCUMENTS

| | | | |
|---|---|---|---|
| 4,558,428 | 12/1985 | Matsumura et al. | 370/85.15 |
| 4,707,832 | 11/1987 | Glenn et al. | 370/85.11 |
| 4,745,593 | 5/1988 | Stewart | 370/15 |
| 4,905,233 | 2/1990 | Cain et al. | 370/94.1 |
| 4,912,656 | 3/1990 | Cain et al. | 340/827 |
| 4,941,142 | 7/1990 | Kida | 370/85.5 |
| 5,031,174 | 7/1991 | Natsume | 370/85.5 |
| 5,056,085 | 10/1991 | Vu | 370/60 |
| 5,086,428 | 2/1992 | Perlman et al. | 370/60 |

*Primary Examiner*—Douglas W. Olms
*Assistant Examiner*—Alpus H. Hsu
*Attorney, Agent, or Firm*—Joel I. Rosenblatt

[57] ABSTRACT

A data transmission network includes circulating loops designed to increase the reliability of the network and its transmission speed. Redundant transmission within the circulating loops is sensed and terminated. This is accomplished by identifying those stations serving as an entrance port to a circulating loop within the network. When a transmission of information is received at that station, it is marked with that station's address. The information is sent into the network including into the circulating loop. As the circulating loop leads back to itself, that transmission is received at the same entrance station which transmitted it into the circulating loop. Upon receipt, the entrance station recognizes its own address and terminates any further transmission.

17 Claims, 3 Drawing Sheets

| DESTINATION I.D. | SOURCE I.D. | NODE ENTRY I.D.'s | DATA | OTHER I.D. |

AUTOMATIC TERMINATION OF LOOP CIRCULATING MESSAGES

BACKGROUND

Communication equipment typically operates around a set of rules. These rules govern the interactions of discrete elements of the communications network. In the case of data communications, the rules, called protocols, are programmed rather than built into the hardware. The protocols are typically a set of rules for grouping bits and characters (framing), error detection and correction (error control), the numbering of messages (sequencing), separating control characters, sorting, receiving and sending (line control), and actions required on initiations (start-up control) and actions required on termination (time-out control). The protocols are typically constructed on a frame, with bits grouped into define sequences and with the positions of the groups defining the meaning of the message. Examples of these protocols are well known in the art and are not discussed here.

Also well known in the art are the kind of communications equipment that use these protocols. Because this communication is well known, the type of equipment is not discussed.

For reference purposes, communications using message packets constructed on a frame such as to be used to practice this invention are described in ANSI/IEEE Standard 802.3, Information Processing Systems Local Area Networks; ISBN 1-55937-805-4. Further, systems using message packets, the manner of construction and use are well known, and for that reason are not discussed here. Examples of such systems are shown in U.S. Pat. No. 4,745,593, Arrangement For Testing Packet Switching Networks; U.S. Pat. No. 4,558,428, Data Transmission System Adapted to Facilitate Detection of Safe Receipt of the Transmitted Data Frame By a Receiving Station; U.S. Pat. No. 5,056,085, Fourth and Forward Routing for Broadcast Packets In Packet Switching Networks; U.S. Pat. No. 5,086,428, Reliable Broadcast and Information In a Wide Area Network.

Within any data communications system, one station may be dedicated to control of the network. That is, a master node may be programmed to initiate messages and to terminate messages that circulate through the system.

The use of a master node can be sufficient where an undelivered message or a message to be delivered circulates through the master node or in only one direction and complete control over the system is thereby insured at the master node. For example, the master node may be a switch. In functioning as a switch, the master node may break the path and in that way prevent recirculation of a message However, in some networks, such as networks having internal circulating loops, and permitting message propagation two or more directions, it is possible for the message to be misdirected such as by continuous circulating within an internal loop, without providing any indication of such malfunction to the master.

SUMMARY OF THE INVENTION

This invention is directed to a communications network. Within this network, are a series of interconnected nodes. Further, in accordance with the inventive principles and the preferred embodiment the network includes internal loops. These internal loops may be characterized as a circulating loops or paths. In a circulating path, a message may enter at an entrance node or port from another part of the network. The circulating path then presents at least two directions for the message to propagate. In the case of a single loop the message may propagate in the clockwise and in the counter-clockwise direction, however, it should be understood that this invention is not limited to a single loop but may be used with multiple circulating paths. Additionally, it should be understood that this invention is not limited to data communications but may be used with any kind of communications where messages are propagated through a system.

As stated above, communications networks of the type described here, their manner of construction and use are well known. Additionally, the protocols describing the construction of the message packets in the processing of the message packages are standardized by ANSI/IEEE Standard 802.3, Information Processing Systems Local Area Networks. Accordingly, the description of the invention is in schematic form limited to the circulating networks and the node stations within the circulating networks. Because the manner of constructing these node stations, interconnecting these node stations into networks and transmitting message packages according to the ANSI/IEEE protocol would be well known to those skilled in the art, details of such construction and use are not included. Further, the message packet itself is shown in schematic form for the same reason as given above as the message packet is constructed according to the ANSI/IEEE protocol and any details of its construction and use would be known to those skilled in the art.

In accordance with the principles of the invention once a message, in a packet form as in the case of the preferred embodiment, enters a circulating loop through an entrance port or loop node, it may circulate in the direction of any path connected to that entrance node. The message will pass to an exit node or port which, in turn, may be connected a successive portion of the network or to other circulating loops. The message may continue within the loop back to the entrance node. In a similar manner, unless the propagation of the message is terminated the message will continue to circulate through the loop blocking the loop and preventing the propagation of other messages.

Accordingly, it is important to terminate any message which enters a loop and completes its circulation through the loop. This termination should be before the message has a chance to recirculate again creating redundancy.

In accordance with the principles of the invention, a means and method is provided for adding to a message the address of the node or port, or nodes or ports, where the message enters the circulating loop or loops. This message then is allowed to circulate in the direction of any path connected to that entrance node or port towards an exit node or in any other direction presented by available paths in the circulating loop. However, now the packet has the address within it of the node where the message entered that circulating loop. When that message completes its circulation and is received back at the entrance node, the message is terminated. Termination is accomplished by recognition of the entrance node address in the packet by that same entrance node. Upon this recognition, the message is terminated. Circulation of a message within a circulating loop may be called "ringing". The principles of this invention are directed to termination of ringing when in a data communications circulating loop, once the message has had an opportunity to circulate back to an initiating communications station. The purpose of the invention is to prevent redundant transmission of messages.

The identification of all the entrance ports through which a packet may have passed may be retained within the packet. For example and as shown in the preferred embodiment, where a packet passes through two or more loops the identification or number of the entrance port for each of those loops would be inserted and retained in the packet. In this way, should a message be desired to be sent back over the same path, the identification of the entrance ports through which the packet has traveled to its destination can be used to route same packet back to the originating station. The protocol for identifying each of these station with respect to the location of the packet may be done by any number of suitable schemes available. For example, a comparison of each of the i.d.'s within the packet can be made by each station. Other possibilities that present themselves are the serial reading of i.d. numbers within a packet by each sequential entrance node (now an exit node when a packet travels in the reverse direction) or any other suitable scheme. This use of node i.d.'s would be particularly useful where an entrance node (now an exit node) is connected to a number of separate paths and propagation over a single one of those paths is desired in the reverse packet direction. As those skilled in the art will understand, use of node identification numbers in the packet, may be used in the forward or reverse direction as well to limit the use of the network to the specific path required for transmission of a packet.

This invention finds particular use in communication systems employing loops which increase reliability by providing redundant communication paths and to reduce the effect of a single path failure. Accordingly, within this type of system and under normal operation information may arrive at any node from two or more directions and recirculate back through the redundant communications path. Circulating is sensed by reading the entrance node address at that same entrance node and terminating the transmission.

Accordingly, what is disclosed is a method for terminating a transmission conducted over a network having a circulating path and stations in the said circulating path, to a destination station comprising marking a transmission entering said circulating path with the identity of a station in said path receiving said transmission; sensing the reception of said transmission at said identified station; terminating the said transmission responsive to the said sensed reception; and marking a transmission into a said circulating path by adding information to said transmission indicative of the said receiving station identity.

Further disclosed is a system for terminating a transmission conducted over a network having circulating paths and stations, to a destination station having means for marking a transmission entering into said circulating path with the identity of the station in said circulating path receiving said transmission; means for sensing the reception of said transmission at said identified station; means for terminating the transmission responsive to the said sensed reception; and means for adding information to said transmission indicative of the said receiving station identity.

Further shown is a data communications network comprising data stations arranged in a propagation path including circulating loops and comprising stations having a capability for initiating messages in packet form and containing the identity of the sending station, and the receiving station; means within said stations located within a said circulating loop and connected to a separate station external said loop for inserting within said message packet, its own identity; the stations having the ability to direct or propagate a message received to any of the other transmission paths connected to said station; said station receiving said message and connected in a circulating, transmitting or propagating said message through said circulating path and back to the said entrance station; and said entrance station terminating the propagation of said message upon receipt of the circulating message at the said entrance node.

Disclosed also is a station within a network having circulating paths and stations; means for identifying said station as an entrance station in a said circulating path; means for sensing the reception of information at said identified station; means for associating the said received information with the said identified station; means for transmitting the said information into said path and for sensing the receipt of said information by said identified station; means for terminating the said transmission responsive to the said sensed reception; and means for adding information to said received information indicative of the said identified station.

DETAILED DESCRIPTION

Figures 1, 2:
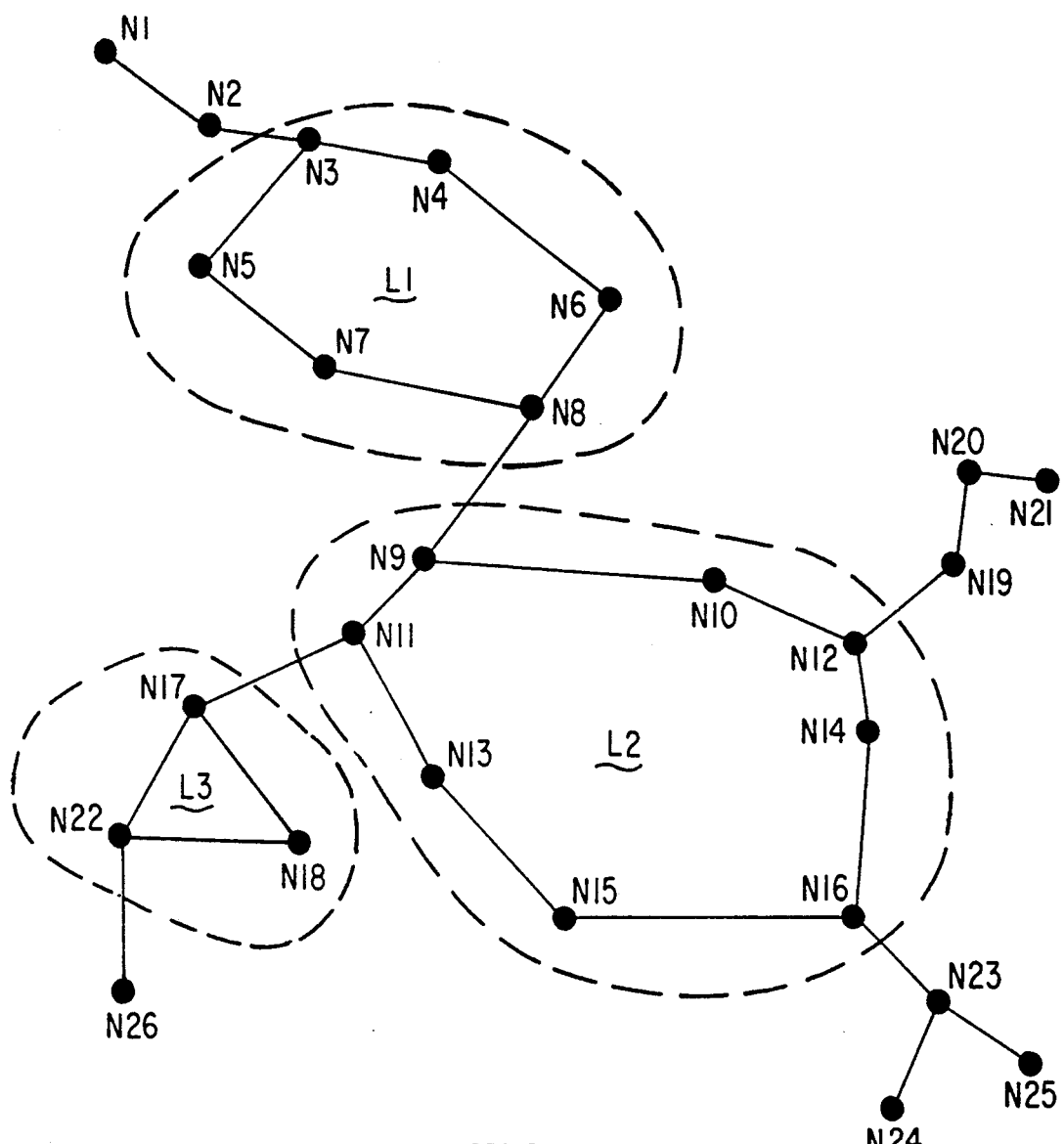
FIG. 1 shows in schematic form, a communications network including recirculating loops.
FIG. 2 shows a data packet, as used in the preferred embodiment, and according to the principles of the invention.

As shown in FIG. 1 a communications network is shown in schematic form. The network comprises a series of nodes N1 through N25. Within the network are circulating loops L1, L2 and L3. Communications may be in any possible direction presented by the paths within the network. For example, communications may start at N1, proceed through N2 and enter circulating loop L1 at entrance port or node N3.

The communications path may then proceed in the two available directions from N3 to N5 to N7 to N8 and also from N3 to N4 to N6 to N8. N8 will then represent the exit port with communications proceeding to N9 where it will then enter loop L2 and proceed in the available paths from N9 to N11, N13, N15 to N16, and L9 through N10, N12, N14 and N16. Accordingly, N9 would be an entrance node or port for loop L2 and N17 would be an entrance node or port for loop L3. Further, N16 would be an exit port or node for loop L2. Additionally, communications may be in the opposite direction for example from N23 to N16 around loop L2 to N9 in the direction shown through N14, N12 and N10 and through N15, N13 and N11.

For purposes of explanation only and to explain the invention according to the preferred embodiment, an information packet containing digital information is shown in FIG. 2. However, it should be understood that this information is not limited to digital communications or packet addressing but may be used in any invention having redundant transmission paths. As shown in FIG. 2, the packet in addition to other information contains a destination node i.d., a source node i.d., a node entry i.d., and other data information. For the principle embodiment as shown in FIG. 1, an example may be a message from node N1 to N26. The packet would contain the source node i.d. N1, the target node i.d. N26 and other data information. As that packet is propagated to N3, the identity of node N3 is placed in the node entry i.d. portion of that packet. That packet then circulates in the direction offered by loop L1 from N5 to N7 to N8 and to N6 to N4 and back to N3. Similarly that message propagates from N3 to N4 to N6 to N8 to N7 to N5 back to N3. Upon reaching exit port or node N8, the message is propagated to N9. Any messages propagated in the initial directions of N5 and N4 are circulated back to N3. N3 then, according to its programming, reads the address in the node entry i.d. portion of the packet. It may for example compare that i.d. with its own i.d. and terminate further transmission in any of the directions with N2, N4 or N5.

The message propagated then continues from exit port or node N8 to N9. As can be seen, N9 has the characteristics of an entry node port within loop L2. An entry node or port may be any node or port within a circulating loop and connected to a node external to that loop. That external loop may or may not be in another circulating loop. N9 being an entrance port is programmed to add its node i.d. into the packet. The message then circulates in the available paths from N9 to N11 to N13 to N15 to N16 to N14 to N12 to N10 and back to N9 and also in the direction of N9 to N10 to N12 to N14 to N16 to N15 to N13 to N11 and back to N9. In a similar manner to the operation of loop L1, N9 upon receiving the circulated message within L2 from N10 or N11 reads the node entry i.d. portion of the packet. Responsive to reading its own node entry i.d. it terminates the transmission to any of the nodes N11, N10 or N8 and recirculation or ringing is prevented.

The message continues its propagation to N11 (loop L2) where circulation is through the available paths N11-N17 and N17 circulating through loop L3 to N22 to N18 to N18 to entrance node N17 and circulating through L3 from N17 to N18 to N22 to N17. When N17 reads its address in the packet circulating in L3, it will terminate all further transmission. The further propagation of the message is through exit node or port N16 eventually reaching N21, N25 and N24 respectively. In accordance with the System operations the propagation of all messages are terminated upon reaching the last station. In the case of the message directed to N26, the message is terminated by N26 responsive to reading its own address.

As explained above, the operation of the network may be in the reverse direction starting from N23, N24 or N25 for example and propagating through L2, L3 and L1 without any change in the event of principles.

As shown in FIG. 2, the node entry i.d. position in the packet may contain a Number of I.D.'s. In one embodiment of the invention, each of the entrance nodes through which the packet passes may insert its address into the node entry i.d. packet portion. In the case of the message preceding from N1 to N26, the node entry i.d. portion of the packet would contain i.d.'s for N3, N9, and N17. Additionally, should it be desired, the exit port i.d.'s may also be inserted within the packet. In the case of the message preceding from N1 to N26, then exit ports N8, and N11 for loop L1 and L2, respectively, would be inserted in the packet. With the addition of the entrance port i.d.'s for the entrance and exit port i.d.'s or with the addition only of the exit port i.d.'s, a message can now be routed backwards in the original propagation pass, in this example from N26 to N1 by using the node i.d.'s through which the packet passed in the forward direction. This may be accomplished by using the entrance nodes in the original propagation direction which become the exit nodes in the reverse propagation direction or the exit nodes in the original propagation direction which now become the entrance nodes in the reverse propagation direction or a combination of both. Accordingly, where the entrance nodes in the original forward direction of propagation are N3, N9 and N17, and the exit nodes are N8 and N11, the new entrance nodes in the reverse propagation direction will be N11 and N8, and the exit nodes will be N9 and N3 accordingly.

Figure 3:
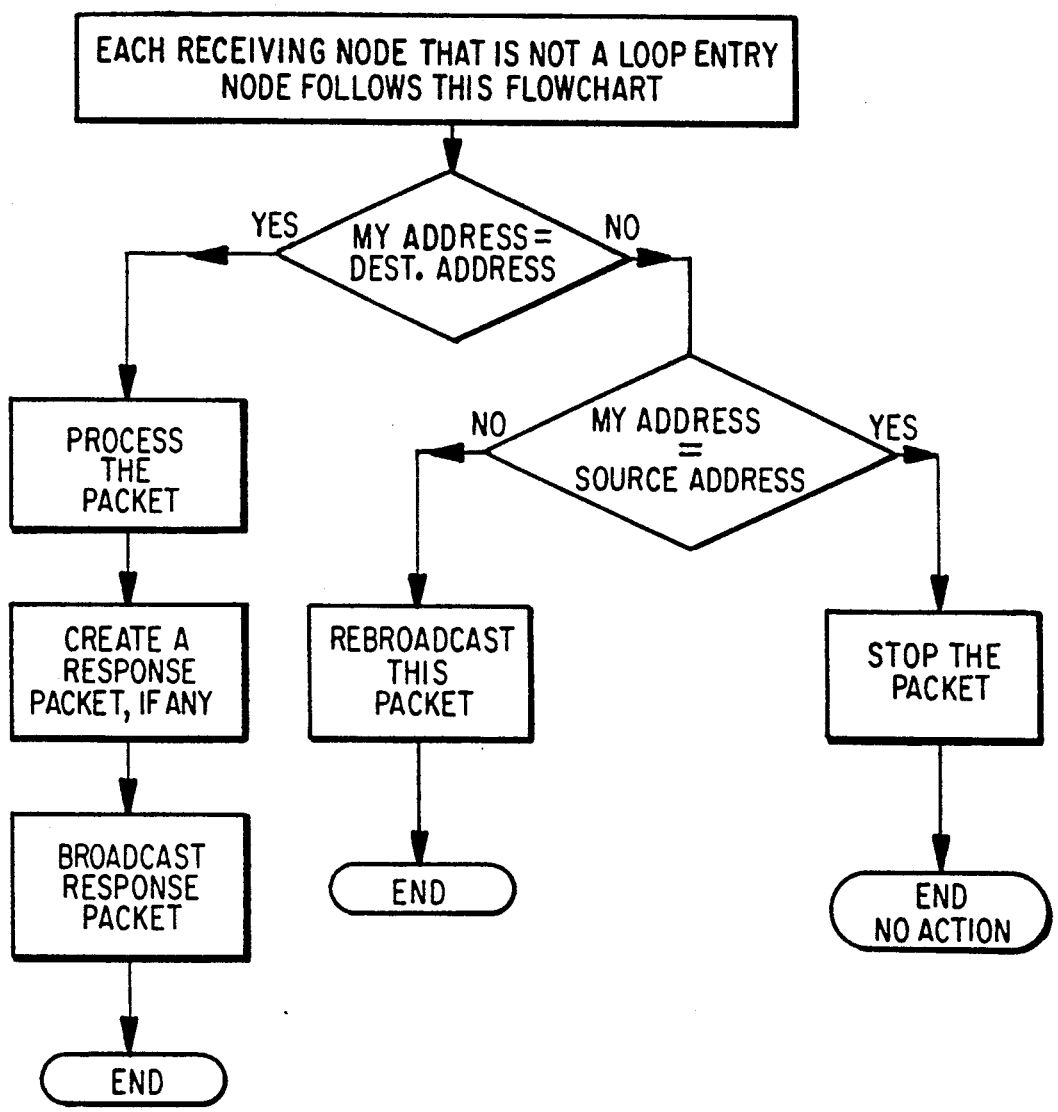
FIG. 3 shows in a flow chart the operation of the communications network at a non-entry port or node.

A message packet used in the preferred embodiment, is shown in FIG. 2. The message packet has a position for the destination i.d. or node entry I.D.'s, a position for the source i.d., a position for the node entry i.d., a position for data and a position for other information as may be required. Operation for the preferred embodiment is shown by the flow chart in FIGS. 3 and 4. FIG. 3 shows the sequence for any node that is not a loop entry node or port. As can be seen, the reception of a packet at a node causes a decision to determine whether the address in the destination i.d. portion of the packet is the same as that node address. Where the address is different, a second comparison is made to determine if the node address is the same as the source address. A positive comparison causes the packet to stop and the information in the data portion is read at that node. A negative comparison causes the node to rebroadcast the message through the next available path. For example where the node receiving the message is node 8, the packet will be rebroadcast to node 9 (assuming the packet was received from node 6 or 7) or the packet would be transmitted from node 8 to node 7 or node 6 (assuming the packet was received from node 6).

Where the address of the node was the same as the destination address within the packet, the packet is processed as will be known to those skilled in the art, and a response packet created if any. If no response is indicated, the transmission ends.

Figure 4:
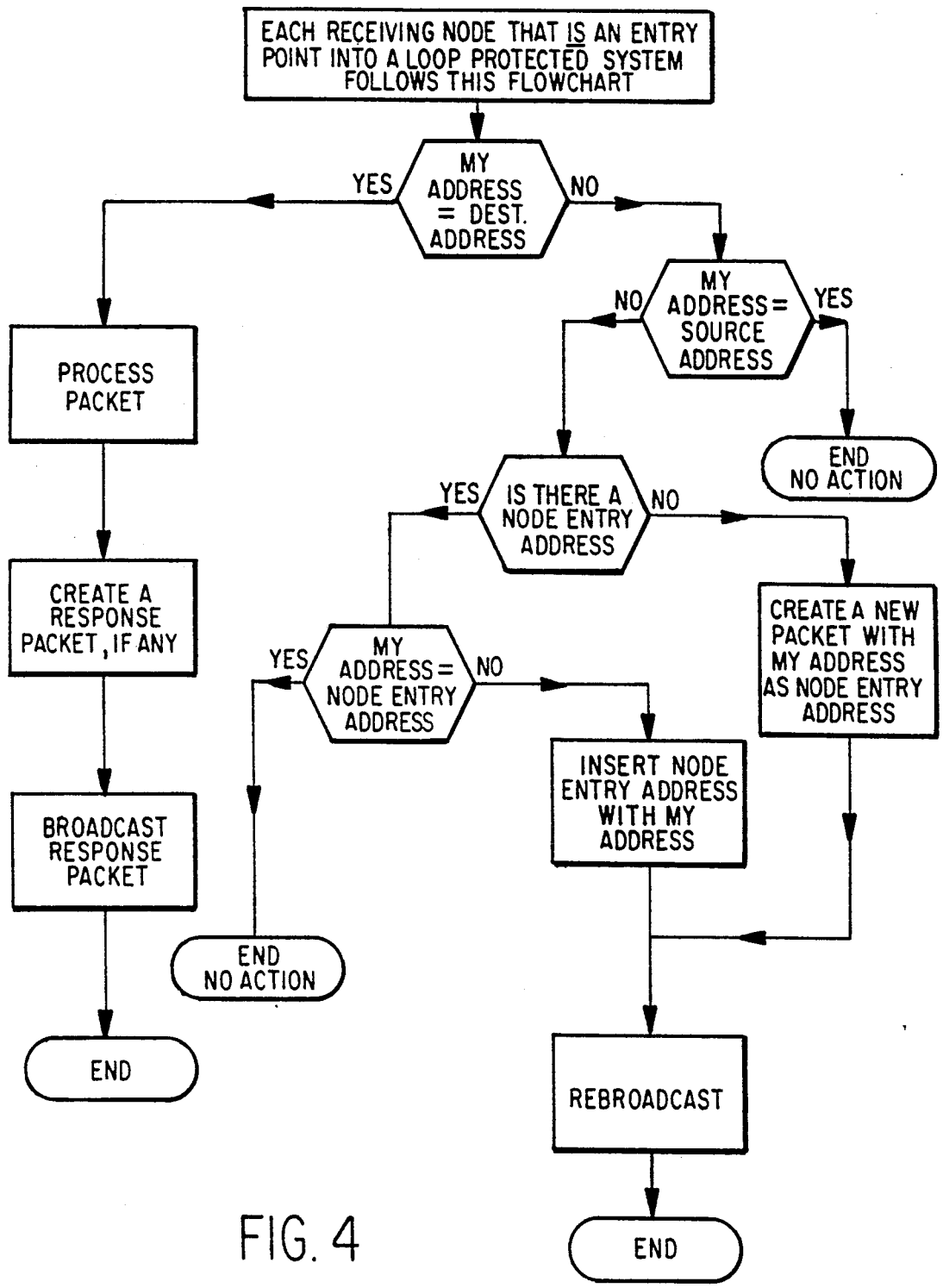
FIG. 4 shows in a flow chart the operation of the communications network at an entry port or node.

The method of invention is shown in the flow charts of FIGS. 3 and 4 would be amended accordingly, as would be apparent to one skilled in the art where the node i.d.'s in the propagation path was saved and used to redirect new transmission. For example, each of the entrance nodes would then be redesignated in the reverse direction as an exit node, and each exit node would be designated in the reverse direction as an entrance node.

FIG. 4 shows the operation of the system according to the principles of the operation where the node receiving the transmission is an entry node or port in a circulating path, such as, for example node N3 in the preferred embodiment and as shown in FIG. 1. As described above, the circulating loop allows the packet to be transmitted in at least two directions from the entry port and to circulate through the loop back to the entry port or node.

A message appearing at an entry port causes the entry port to compare its address with the destination address.

Where that comparison is negative, a second comparison is made to determine if the node address is the same as the source address. Where that comparison is positive, the information is read as is shown in FIG. 4 and no further action is taken. Where that comparison is negative, a further comparison to determine if there is an entry port or node address in the packet. Where that comparison is negative, the node entry port addresses is added to the packet or a new packet is created with the node entry port address added and then rebroadcast. Where that comparison is positive, a further comparison is made to determine if the node entry port address is the same as the node entry address located within the packet. Where that comparison is positive, the transmission is terminated and no rebroadcast occurs. Where that comparison is negative, the node entry address within the packet is replaced with the address of the node or the address of the node added to the packet and the packet is rebroadcast.

Accordingly, as can be seen from the above description, a communications system may include at least two or more communications paths from a node. In this way, reliability is increased by increasing the number of available paths to a destination. However, where this redundancy creates circulating loops such that any message propagated through the system may propagate back to its originating station, such as an entry port or node in a loop, a means is needed to terminate the recirculation or propagation of that message. This invention provides such a means by inserting the i.d. of the node at the entry port of the circulating loop. That node station then terminates the repropagation of the message when that message is received back at that same node. Of course, it will be clear to those skilled in the art that the entry node may be positioned anywhere in the loop, not necessarily at the entry port it only being necessary to terminate the transmission to prevent it recirculating in a system. However, for practical reasons, terminating the message propagation at the entry port prevents the message from being circulated back to its source node and thereby eliminates that level of redundancy.

Further, in accordance with the description above, the i.d.'s of the entrance nodes in the propagation path may be retained in the packet in any combination or use, for example when directing a packet in the return or reverse propagation path.

What is claimed is:

1. A method for terminating the transmission of a message sent in two directions along a first circulating loop, including a plurality of node stations comprising the steps of:
   a. transmitting a message packet to a first node station in said first circulating loop, from a second node station located outside said first circulating loop;
   b. receiving said message packet at said first node station;
   c. placing the identification of said first node station within said message packet;
   d. transmitting said message packet from said first node station to said plurality of node stations in said first circulating loop in a first direction around said first circulating loop and in a second direction around said first circulating loop opposite to said first direction.
   e. receiving said message packet, transmitted in said first direction at said first node station, detecting said identification of said first node station placed in said message packet, and terminating said transmission in said first direction of said message packet;
   f. receiving said message packet transmitted in said second direction, at said first node station, detecting said identification of said first node station placed in said message packet and terminating the transmission in said second direction of said message packet.

2. The method of claim 1 including the steps of transmitting said message packet in said first and second directions to a third node station located within said first circulating loop and transmitting said message packet from said third node station to a fourth node station located outside said first circulating loop.

3. The method of claim 1 including the steps of transmitting said message packet in said first and second directions to a third node station located within said first circulating loop and transmitting said message packet from said third node station to a fourth node station located outside said first circulating loop and within a second circulating loop; and the steps of
   a. receiving said message packet at said fourth node station;
   b. placing the identification of said fourth node station within said message packet;
   c. transmitting said message packet from said fourth node station to said plurality of node stations in said second circulating loop in a first direction and in a second direction around said second circulating loop opposite to said first direction;
   d. receiving said message packet, transmitted in said first direction, at said first node station, detecting said identification of said first node station placed in said message packet, and terminating said transmission in said first direction of said message packet;
   e. receiving said message packet, transmitted in said second direction, at said fourth station, detecting said identification of said fourth node station placed in said message packet, and terminating the transmission in said second direction of said message packet.

4. The method of claim 3 including the step of adding the identification of a destination node station to said message packet;
   said step of transmitting said message packet includes the step of transmitting said message packet to said destination node station; and
   the step of receiving said message packet at said destination node station, detecting said destination node station identification, and terminating the transmission of said message packet.

5. The method of claim 4 including the step of identifying node stations locations in said first and second circulating loops, connected to node stations outside said first and second circulating loops, as entrance or exit node stations.

6. The method of claim 5 including the step of marking a message packet transmitted from an exit node station located in said second circulating loop to a fifth node station located outside said second circulating loop, with the identity of said exit node station.

7. The method of claim 6 including the step of using said exit port location for retransmitting said message packet in a reverse direction from said fifth node station to said exit node station.

8. The method of claim 1 wherein said first and second directions are in clockwise and counterclockwise directions.

9. The method of claim 1 wherein said transmitting step in said first and second directions transmits said message packet in clockwise and counterclockwise directions.

10. A system for terminating the transmission of a message sent in two directions along a first circulating loop, including a plurality of node stations comprising:
   a. means for transmitting a message packet to a first node station in said first circulating loop, from a second node station located outside said first circulating loop;
   b. means for receiving said message packet at said first node station;
   c. means for placing the identification of said first node station within said message packet;
   d. means for transmitting said message packet from said first node station to said plurality of node stations in said first circulating loop in a first direction around said first circulating loop and in a second direction around said first circulating loop opposite to said first direction.
   e. means for receiving said message packet, transmitted in said first direction at said first node station, detecting said identification of said first node station placed in said message packet, and terminating said transmission in said first direction of said message packet;
   f. means for receiving said message packet transmitted in said second direction, at said first node station, detecting said identification of said first node station placed in said message packet and terminating the transmission in said second direction of said message packet.

11. The system of claim 10 including means for transmitting said message packet in said first and second directions to a third node station located within said first circulating loop and transmitting said message packet from said third node station to a fourth node station located outside said first circulating loop.

12. The system of claim 10 including means for transmitting said message packet in said first and second directions to a third node station located within said first circulating loop and transmitting said message packet from said third node station to a fourth node station located outside said first circulating loop and within a second circulating loop; and a. means for receiving said message packet at said fourth node station;
   b. means for placing the identification of said fourth node station within said message packet;
   c. means for transmitting said message packet from said fourth node station to said plurality of node stations in said second circulating loop in a first direction and in a second direction around said second circulating loop opposite to said first direction;
   d. means for receiving said message packet, transmitted in said first direction, at said first node station, detecting said identification of said first node station placed in said message packet, and terminating said transmission in said first direction of said message packet;
   e. means for receiving said message packet, transmitted in said second direction, at said fourth station, detecting said identification of said fourth node station placed in said message packet, and terminating the transmission in said second direction of said message packet.

13. The system of claim 12 including means for adding the identification of a destination node station to said message packet;
   said means for transmitting said message packet includes means for transmitting said message packet to said destination node station; and
   means for receiving said message packet at said destination node station, detecting said destination node station identification, and terminating the transmission of said message packet.

14. The system of claim 13 including means for identifying node stations locations in said first and second circulating loops, connected to node stations outside said first and second circulating loops, as entrance or exit node stations.

15. The system of claim 14 including means for marking a message packet transmitted from an exit node station located in said second circulating loop to a fifth node station located outside said second circulating loop, with the identity of said exit node station.

16. The system of claim 15 including means for using said exit port location for retransmitting said message packet in a reverse direction from said fifth node station to said exit node station.

17. The system of claim 15 wherein said first and second directions are in clockwise and counterclockwise directions.

* * * * *